United States Patent [19]
Degani et al.

[11] Patent Number: 5,505,367
[45] Date of Patent: Apr. 9, 1996

[54] METHOD FOR BUMPING SILICON DEVICES

[75] Inventors: Yinon Degani, Highland Park; Thomas D. Dudderar, Chatham; John G. Spadafora, Yardville, all of N.J.

[73] Assignee: AT&T Corp., Murray Hill, N.J.

[21] Appl. No.: 333,168

[22] Filed: Nov. 2, 1994

[51] Int. Cl.⁶ .............................. B23K 1/00; B23K 31/02
[52] U.S. Cl. ........................................ 228/248.1; 228/254
[58] Field of Search ............................... 228/248.1, 191, 228/254, 180.22, 56.3

[56] References Cited

U.S. PATENT DOCUMENTS

| | | | |
|---|---|---|---|
| 4,892,245 | 1/1990 | Dunaway et al. | 228/180.22 |
| 5,284,287 | 2/1994 | Wilson et al. | 228/254 |
| 5,323,947 | 6/1994 | Juskey et al. | 228/180.22 |

FOREIGN PATENT DOCUMENTS

| | | | |
|---|---|---|---|
| 1-199494 | 8/1989 | Japan | 228/254 |

OTHER PUBLICATIONS

"Magnetic Stencil Paste Screening Method," *Research Disclosure*, Jun. 1991, No. 326, Disclosure No. 32645.

R. R. Tummala and E. J. Rymaszewski, Eds., Microelectronics Packaging Handbook, Van Nostrand Reinhold, 1989, Ch. 6, pp. 361–447.

*Primary Examiner*—P. Austin Bradley
*Assistant Examiner*—Jeffrey T. Knapp
*Attorney, Agent, or Firm*—Robert B. Levy

[57] ABSTRACT

The bonding pads (18) of a semiconductor chip (12) each may be provided with a solder bump (36) by first screen printing a pattern of solder paste (36) on a heat-resistant, non-wettable surface (24). The chip (12) is then placed on the surface (24) so each bonding pad (18) contacts a portion of the solder paste pattern (36). The solder paste is then reflowed, yielding molten solder that bonds to the bonding pads (18) of the chip, but not to the surface (24). After reflow, the chip, with its now-bumped pads, is removed from the surface for subsequent soldering to a wettable substrate.

4 Claims, 2 Drawing Sheets

METHOD FOR BUMPING SILICON DEVICES

TECHNICAL FIELD

This invention relates to a technique for bumping (i.e., providing) solder on each of the metallized areas (i.e., bonding pads) of a silicon device.

BACKGROUND ART

Much research has been devoted towards developing Multi-Chip Modules (MCMs) that comprise at least one semiconductor chip (e.g., silicon) bonded to a silicon substrate of which there may be many on a given wafer. In practice, the chips are bonded to the silicon substrate by a process known as "flip-chip" bonding that is commenced by screen printing solder paste on the silicon substrate to coat each bond site on the substrate with paste. The bond sites on the substrate are arranged in patterns, each corresponding to a pattern of bonding pads on each chip of which there are many types, with many different bonding patterns, on each substrate. Thereafter, each chip is placed on the silicon substrate so that its bonding pads contact the corresponding solder paste-coated bond sites on the substrate. The solder paste is then reflowed to yield molten solder that wets and metallurgically bonds each bond site on the substrate to each bonding pad on each chip. Once the chips are bonded to the silicon substrate, the substrate is then diced to create individual subassemblies, referred to as "tiles," that are then packaged.

Typically, each chip is tested prior to placement on the silicon substrate. However, a chip may become defective after placement, or a defective chip may escape detection during testing. Thus, a tile may contain one or more defective chips. Depending on the cost of the chips on the tile, it may be advantageous to remove and replace each defective chip. In practice, when a defective chip is removed, much of the solder bonding that chip to the substrate is also removed, leaving only a small amount of solder on the now-exposed bond sites. The solder remaining on the exposed bond sites is usually insufficient to reliably bond a new bare chip (i.e., a chip whose bonding pads contain no solder). Thus, additional solder must be provided. In the past, solder has been provided by applying solder to the bonding pads of the replacement chip (i.e., "bumping" the bonding pads) rather than by applying solder to the exposed bond sites on the substrate as in the practice described above. Applying solder to the silicon substrate once it has been populated with chips and then diced into tiles is extremely difficult.

Presently, integrated circuit chips are bumped in a batch process of many chips on each silicon wafer. To reduce the cost, the process is carried out on many wafers at one time. In such a process, as described in chapter 6 of the text *Microelectronics Packaging Handbook* by R. Tummala et al. (Van Nostrand Reinhold 1989), all of the chips are bumped together by first masking each wafer so that only the bonding pads are exposed. Thereafter, a group of elemental metals, comprising a solder alloy, is evaporated onto each wafer to coat the bonding pads exposed through the mask. Then, each wafer is heated in a reducing atmospheres to melt ("reflow") the deposited metals, thereby homogenizing the solder and forming alloy "bumps" on the bonding pads. Subsequently, each wafer is tested, marked and diced into individual chips for sorting and application to the traditional ("C-4-type") flip-chip assembly and/or repair. This process, while effective, can be only economically applied to bumping whole undiced wafers containing may hundreds of chips at a time. Moreover, this process requires the use of costly semiconductor processing equipment which makes the application of this process to the bumping of chips for repair purposes very expensive and impractical when only a small number of bumped chips are needed.

Thus, there is a need for a cost-efficient process for solder bumping the bonding pads of individual semiconductor chips.

BRIEF SUMMARY OF THE INVENTION

Briefly, in accordance with the invention, the bonding pads on a semiconductor chip are bumped with solder by first depositing solder paste in a pattern, corresponding to the bonding pads of the chip, on a non-solder wettable, heat-resistant surface. In a preferred embodiment, the surface may comprise a layer of KAPTON material overlying a silicon substrate, such as a silicon wafer or the like. After the paste has been deposited, then the semiconductor chip is placed onto the non-wettable surface so that each bonding pad of the chip contacts a portion the solder paste pattern. Thereafter, the solder paste is reflowed by heating the chip and the non-solder wettable, solder paste-coated surface to yield molten solder. The molten solder wets, and bonds to the bonding pads on the chip since the pads are solder-wettable. However, the surface on which the solder paste is printed is non-solder wettable, and therefore, no solder bonds thereto. After the solder has bonded to the bonding pads of the chip, the chip, now bumped with solder, is removed from the non-solder wettable surface. The now-bumped chip may be soldered onto a substrate in place of a defective chip, or the chip may be used to populate a bare substrate.

DETAILED DESCRIPTION

Figure 1:
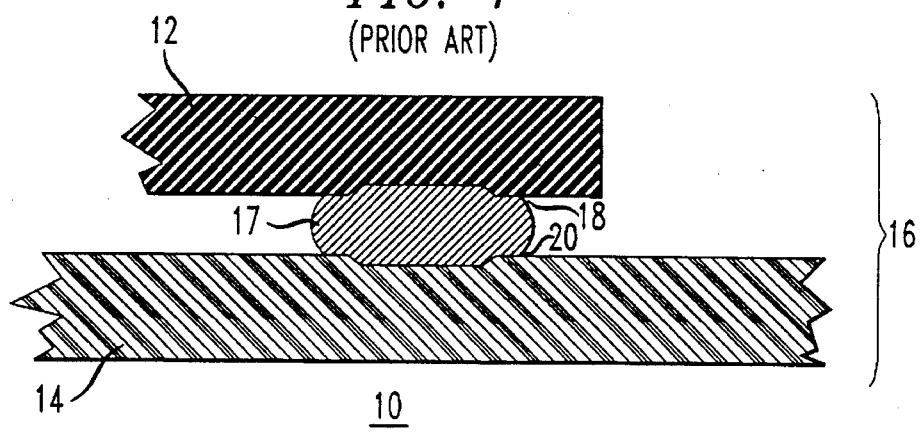
FIG. 1 is an side view in cross section of a portion of a prior-art MCM.

FIG. 1 shows a portion of a prior art Multi-Chip Module (MCM) 10 comprised of at least one semiconductor chip 12 bonded to a substrate 14 (e.g., a silicon wafer). A complete MCM 10 typically further includes a package (not shown) for surrounding the chip 12 and the substrate 14. The combination of the chip 12 and the substrate 14 forms a subassembly 16 referred to in the art as a tile. The tile 16 is fabricated by bonding the chip 12 to the substrate 14 via a volume of solder 17 that electrically and mechanically bonds each solder-wettable bonding pad 18 on each chip to a corresponding solder-wettable bonding site 20 on the substrate. Each bonding pad 18 and each bond site 20 comprises a metallized area fabricated from an appropriate solder-wettable metallization. While the chip 12 and the substrate 14 are shown with a single bonding pad 16 and single bonding site 18, respectively, typically, the chip and substrate have multiple bonding pads and bonding sites, respectively. Although not shown, each bonding pad 16 of the chip 12 may be provided with a volume of solder by the previously described evaporative process during the manufacture of the chip.

While each chip 12 is usually tested prior to solder-bonding to the substrate 14, it is nonetheless possible for a tile 16 to contain one or more defective chips. Depending on the fabrication cost of the tile, 16, it may be advantageous to repair the tile by unsoldering and removing each defective chip 12 and soldering a good chip in its place. In practice, when a defective chip 12 is removed, much of the volume of solder 17 that had bonded the chip to the substrate is also removed. Thus, there is usually an insufficient volume of solder 17 to reliably bond a "bare" replacement chip 12 (i.e., a chip having no solder on its bonding pads 20). While it is possible to "bump" (i.e., provide) the bonding pads 20 of a replacement chip 12 with a volume of solder by evaporation, such a method has proven impractical because of the high cost of the equipment needed to carry out the process and the need to have the chips in whole wafer form to do so.

Figure 2:
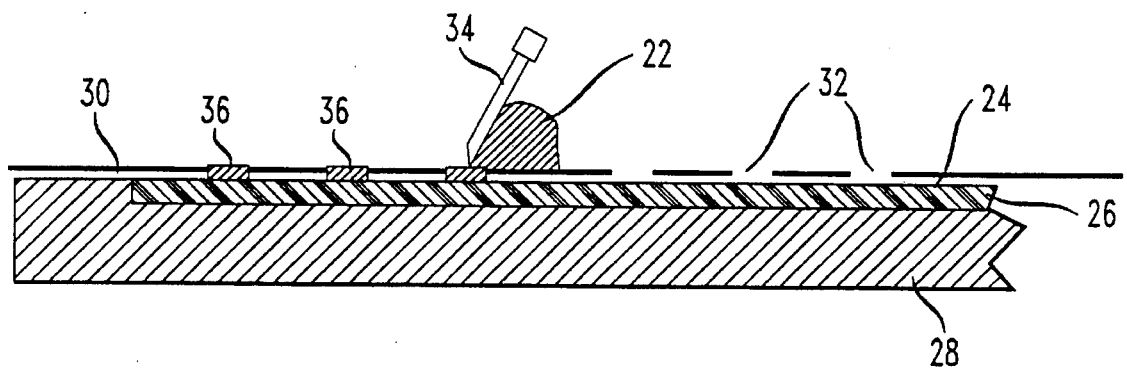
FIGS. 2–4 each illustrate a separate one of a set of steps of a method in accordance with the invention for bumping each bonding pad on a semiconductor chip with solder.
Figure 3:
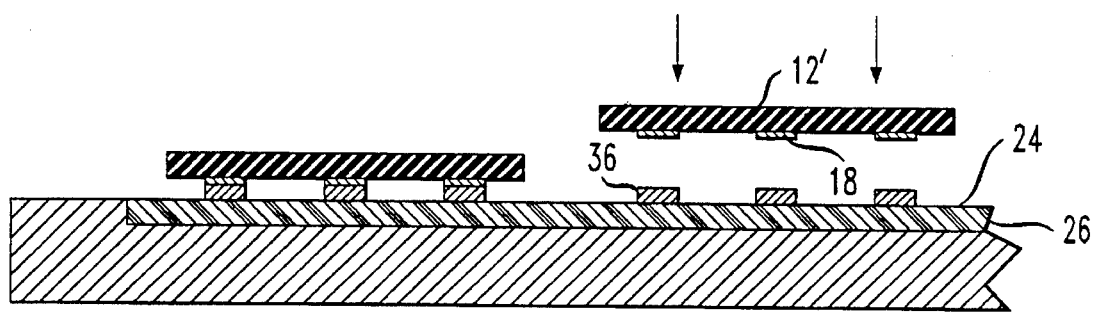
Figure 4:
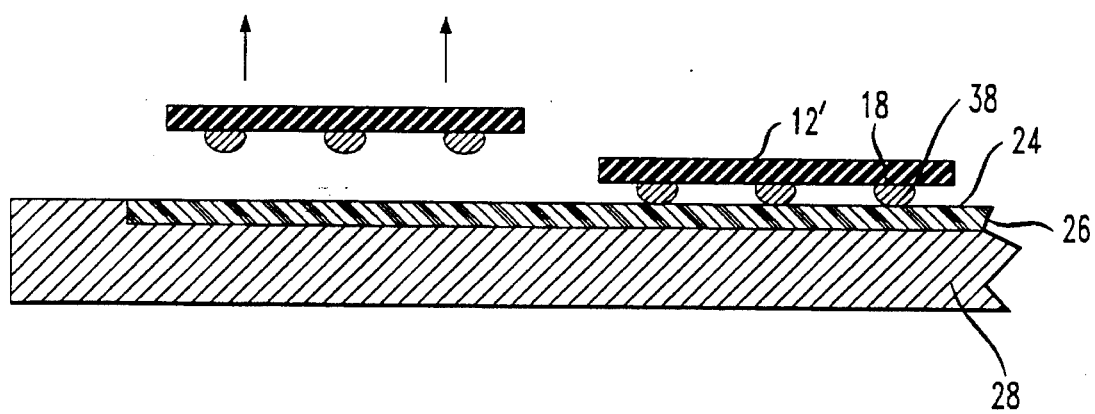

In accordance with the invention, a low-cost, simple method has been developed for solder bumping individual bare chips 12. The steps of the method are illustrated in FIGS. 2–4. Referring to FIG. 2, the first step in the method of the invention is to screen print solder paste 22 onto a first, non-wettable surface 24 of a substrate 26, such as a silicon wafer. The exact nature of the substrate 26 is not critical to the method of the invention except that the substrate must be capable of withstanding temperatures in excess of the reflow temperature of the paste 22. Also, it is required that the major surface 24 of the substrate be non-wettable, that is, the surface must not bond to solder. However, the substrate surface 24 must be able to be printed with solder paste. In practice, a silicon wafer having an un-metallized, mirrored surface, has been found to be suitable for practicing the invention. Alternatively, a silicon wafer having a metallized major surface can be rendered suitable by providing a layer of KAPTON material over the metallization to provide a surface that is non-wettable, yet printable with solder paste.

As shown in FIG. 2, the solder paste printing operation is carried out by first securing the substrate 26 to a pallet 28 to temporarily immobilize the substrate. Next a stencil 30 is placed over the substrate in face-to-face relationship with the substrate surface 24. The stencil 30 typically comprises a thin sheet of metal (e.g. brass or stainless steel) having a plurality of openings 32 arranged in patterns, each corresponding to the pattern of bonding pads 18 (see FIG. 1) on a replacement chip (not shown). The solder paste 22 is deposited onto the stencil 30 and then a squeegee blade 34 is moved across the stencil to force the paste into the stencil openings 32 and onto the substrate surface 24. In this way, at least one solder paste pattern 36 is printed onto the surface 24.

Referring to FIG. 3, once the solder paste pattern 36 is printed, then the stencil 30 of FIG. 2 is removed. Thereafter, a bare chip 12', that is, a chip having little if any solder on its solder-wettable bonding pads 18, is placed on the substrate surface 24 such that each bonding pad on the chip contacts a portion of the solder paste pattern 36. After placement of each chip 12', the solder paste in the pattern 36 is reflowed. During reflow, the solder paste becomes molten solder that wets each pad 18 on the chip 12' and metallurgically bonds thereto, forming a solder bump 38 shown in FIG. 4. Since the surface 24 of the substrate 26 is non-wettable, the molten solder resulting from reflow of the solder paste pattern 36 does not bond to the surface. Thus, the molten solder only bonds to the chip 12'. Once the solder has cooled, each now-bumped chip 12' is then removed from the substrate.

The advantage of solder-bumping each chip 12' in the manner described is that the bumping process can be carried out with the same stencil, wafer pallet, chips, chip placement program and automated placement equipment (not shown) that are normally used to fabricate the tiles 16 of FIG. 1. Thus, the overall cost of bumping each chip 12' will be far less than if each type of chip were bumped by the conventional process of evaporation onto the chip wafer (not shown). Not only can the method of the invention to used to bump individual bare chips 12 for repair purposes, the process may indeed be sufficiently economical to bump chips for production purposes as well.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for providing solder on solder-wettable bond sites on a semiconductor chip, comprising the steps of:

providing a non-wettable, heat-resistant surface that is printable with solder paste;

printing a pattern of solder paste, corresponding to the pattern of bond sites on the chip, on the non-wettable, heat-resistant surface;

placing the chip on the surface so that the bonding pads on the chip contact a portion of the pattern of solder paste;

reflowing the pattern of solder paste to yield molten solder that wets and bonds to the bonding pads of the chip; and removing the chip from the surface once the molten solder has cooled.

2. The method according to claim 1 wherein the pattern of solder paste is printed by the steps of:

placing a stencil, having a pattern of openings therein corresponding to the pattern of bonding pads on the chip, in face-to-face relationship with the surface; and forcing solder paste through the openings in the stencil and onto the surface.

3. The method according to claim 1 wherein the step of providing the non-wettable, heat-resistant surface comprises the step of:

providing a silicon wafer having a mirrored, non-metallized major surface.

4. The method according to claim 1 wherein the step of providing the non-wettable, heat-resistant surface comprises the step of:

providing a silicon wafer having metallization on a first major surface; and providing a non-wettable, heat-resistant layer over the major surface of the wafer.

* * * * *